(12) United States Patent
Ejima et al.

(10) Patent No.: US 7,755,675 B2
(45) Date of Patent: Jul. 13, 2010

(54) INFORMATION PROCESSING APPARATUS AND RECORDING MEDIUM

(75) Inventors: Satoshi Ejima, Tokyo (JP); Akihiko Hamamura, Chiba (JP)

(73) Assignee: Nikon Corporation, Tokyo (JP)

( * ) Notice: Subject to any disclaimer, the term of this patent is extended or adjusted under 35 U.S.C. 154(b) by 989 days.

(21) Appl. No.: 11/056,258

(22) Filed: Feb. 14, 2005

(65) Prior Publication Data

US 2005/0146628 A1 Jul. 7, 2005

Related U.S. Application Data

(63) Continuation of application No. 09/927,326, filed on Aug. 13, 2001, now abandoned, which is a continuation of application No. 08/972,455, filed on Nov. 18, 1997, now abandoned.

(30) Foreign Application Priority Data

Jun. 17, 1997 (JP) ................................ 09-159528

(51) Int. Cl.
*H04N 5/76* (2006.01)
*G03B 3/00* (2006.01)

(52) U.S. Cl. ..................... 348/231.4; 386/96
(58) Field of Classification Search ............ 348/231.99, 348/232, 333.02, 333.05, 231.4; 386/96–99
See application file for complete search history.

(56) References Cited

U.S. PATENT DOCUMENTS 5,099,262 A 3/1992 Tanaka et al.
5,323,367 A 6/1994 Tamura et al.
5,555,098 A * 9/1996 Parulski ...................... 386/104
5,648,760 A 7/1997 Kumar
5,682,433 A * 10/1997 Pickard et al. ................ 381/61

(Continued)

FOREIGN PATENT DOCUMENTS

JP A 07-184160 7/1995

(Continued)

OTHER PUBLICATIONS

Jul. 9, 2009 Office Action for Japanese Patent Application No. 9-159528 (with English translation).

(Continued)

*Primary Examiner*—Nhan T Tran
*Assistant Examiner*—Trung Diep
(74) *Attorney, Agent, or Firm*—Oliff & Berridge, PLC

(57) ABSTRACT

An information processing apparatus provides for continuous reproduction of audio data that has been added to and associated with image data. After a table of data sets recorded on a memory card (for example) is displayed, a data set is selected, e.g., by pressing a display associated with that data set. When an audio recording button is depressed, the sound is collected by a microphone while the button is depressed. The audio data corresponding to the sound is recorded on the memory card as second audio data of the data set when the selected data set already includes audio data. When the data set is reproduced, the image corresponding to the image data of that data set is displayed and the sound corresponding to each of the first and second audio data is output from the speaker in a continuous sequence.

38 Claims, 15 Drawing Sheets

U.S. PATENT DOCUMENTS

| | | | |
|---|---|---|---|
| 5,689,742 A * | 11/1997 | Chamberlain, IV | 396/313 |
| 5,715,318 A * | 2/1998 | Hill et al. | 381/300 |
| 5,717,967 A | 2/1998 | Lee et al. | |
| 5,719,922 A | 2/1998 | Bremer et al. | |
| 5,771,414 A | 6/1998 | Bowen | |
| 5,784,525 A | 7/1998 | Bell | |
| 5,812,736 A * | 9/1998 | Anderson | 386/96 |
| 5,818,436 A * | 10/1998 | Imai et al. | 715/203 |
| 5,832,065 A | 11/1998 | Bannister et al. | |
| 5,903,309 A | 5/1999 | Anderson | |
| 5,974,386 A | 10/1999 | Ejima et al. | |
| 5,999,505 A | 12/1999 | Yasui | |
| 6,128,037 A * | 10/2000 | Anderson | 348/231.4 |
| 6,134,392 A | 10/2000 | Gove | |
| 6,683,649 B1 | 1/2004 | Anderson | |
| 2001/0031131 A1 * | 10/2001 | Fukai et al. | 386/52 |
| 2002/0008763 A1 | 1/2002 | Kawamura et al. | |

FOREIGN PATENT DOCUMENTS

| | | |
|---|---|---|
| JP | A-7-249259 | 9/1995 |
| JP | A 07-322195 | 12/1995 |
| JP | A-8-18922 | 1/1996 |
| JP | A 09-018819 | 1/1997 |
| JP | A-09-147095 | 6/1997 |
| JP | A-09-149307 | 6/1997 |

OTHER PUBLICATIONS

Dec. 15, 2009 Office Action for Japanese Patent Application No. 9-159528 (with English translation).

* cited by examiner

INFORMATION PROCESSING APPARATUS AND RECORDING MEDIUM

This is a Continuation of application Ser. No. 09/927,326 filed Aug. 13, 2001, which in turn is a Continuation of application Ser. No. 08/972,455 filed Nov. 18, 1997. The entire disclosure of the prior applications is hereby incorporated by reference herein in its entirety.

INCORPORATION BY REFERENCE

The disclosure of the following priority application is herein incorporated by reference: Japanese Patent Application No. 09-159528, filed Jun. 17, 1997.

BACKGROUND OF THE INVENTION

1. Field of Invention The invention relates to an information processing apparatus and recording medium. More particularly, the invention relates to an information processing apparatus and recording medium for storing and managing a plurality of types of data including image data and audio data.

2. Description of Related Art

Imaging apparatus such as electronic cameras record images as digital data. These apparatus in recent years have become very popular. Other electronic equipment that has become popular in recent years with the advances of semiconductor technology, are electronic notebooks. Electronic notebooks typically manage personal information and schedules. In many instances the electronic notebooks include touch tablets which provide a mechanism for detecting pressure operations (i.e., contact with the touch tablet) by a user. For example, these operations may include the recordation of handwriting input by a user into a digital format.

In addition to the above electronic equipment, digital video cameras which record sound and images are also becoming popular. In these apparatus, audio data is recorded either in conjunction with the images and/or as separate data before, during or after the images are recorded. However, if additional sound is recorded after image data is already recorded, that additional sound is recorded as separate audio data from the audio data that is already recorded. Thus, when the sound accompanying the image is played back, it is necessary to select at least two separate audio data for playback. This causes, in many instances, non-continuous sound playback.

SUMMARY OF THE INVENTION

It is an object of the invention to provide continuous audio data playback even when audio data is added to previously recorded audio data.

This and other objects are provided by designating a data set associated with recorded audio data and recorded image data. Playing back continuous sound is then accomplished by successively recording added audio data as data for the data set to which the data of the image belongs.

According to an embodiment of the invention, an information processing apparatus includes storage means for storing data sets made of a plurality of types of data. The plurality of types of data within a data set are correlated to each other. A selection means selects a data set from the data sets stored in the storage means. The selected data set includes first audio data. An audio collecting means collects sound and converts it into second audio data. A control means causes the second audio data to be stored in the storage means in addition to the first audio data correlated with the data set selected by the selection means.

The invention can be applied to electronic cameras that record sound in addition to other information such as, for example, photographic images and line drawings (memos). The invention also is applicable to devices other than electronic cameras.

According to another embodiment of the invention, an information processing apparatus includes audio collecting means for collecting sound and converting the collected sound into audio data. For example, a record button, which functions as an operation means, can be operated to collect the sound and create the audio data. A storage means stores the collected audio data. A selection means selects first audio data stored in the storage means. A control means causes second audio data collected by the audio collecting means to be stored in the storage means in addition to the first audio data selected by the selection means as data of a single data set.

The second audio data is stored correlated with the first audio data when the first audio data has been selected by the selection means. When the first audio data has not been selected by the selection means, the control means causes the second audio data to be stored in the storage means without the first audio data.

A recording medium can be provided that stores a computer-readable control program that causes the information processing apparatus to function as described above.

These and other aspects and salient features of the invention will be described in or apparent from the following detailed description of preferred embodiments.

BRIEF DESCRIPTION OF THE DRAWINGS

The invention will be described with reference to the figures in which like reference numerals designate like elements and wherein.

DETAILED DESCRIPTION OF PREFERRED EMBODIMENTS

Figure 1:
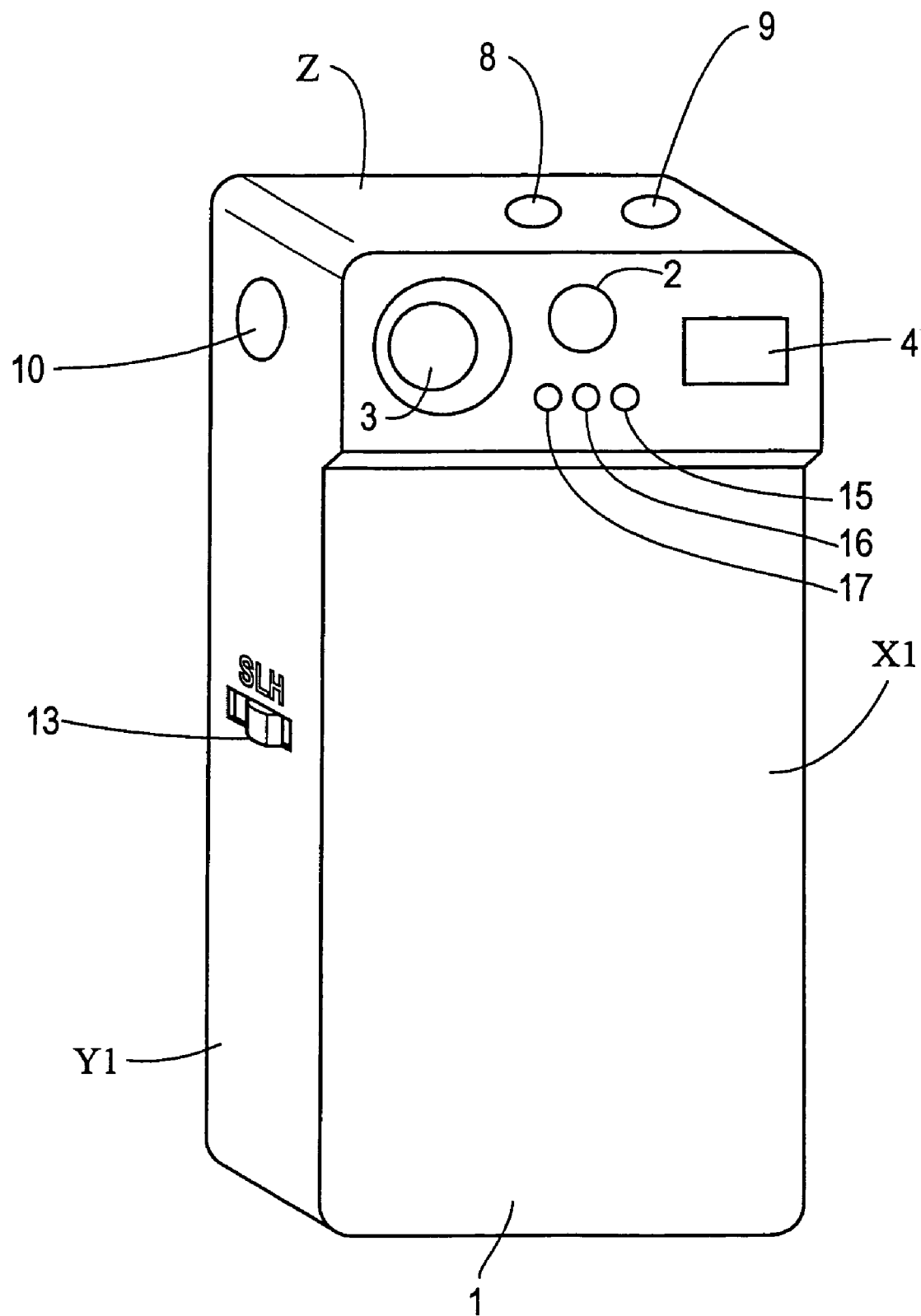
FIG. 1 is a front perspective view of an embodiment of an electronic camera according to the invention.

FIG. 1 shows an embodiment of an electronic camera according to the invention. As seen in FIG. 1, the electronic camera comprises surfaces X1, Y1 and Z. Surface X1 faces an object being photographed, whereas surface Y1 is a side surface and surface Z is a top surface of the electronic camera 1. The electronic camera 1 further comprises a viewfinder 2 and a shooting lens 3. The viewfinder 2 confirms the photographic range of the object being photographed and the shooting lens 3 collects light from the object being photographed. A light-emitting unit 4 is also provided for emitting light that illuminates the object being photographed. In preferred embodiments, the shooting lens 3, viewfinder 2 and light emitting unit 4 are proximate to the top portion of surface X1.

Surface X1 of electronic camera 1 also includes a red-eye reduction lamp 15, a photometry device 16 and a colorimetry device 17. The red eye reduction lamp 15 emits light prior to the light emitting unit 4 emitting light in order to reduce a red-eye phenomena The photometry device 16 measures an amount of light from the object being photographed and the surrounding area and outputs the results to a photometry circuit 51. The colorimetry device 17 measures a color temperature of the object being photographed and the surrounding area and outputs the results to a colorimetry circuit 52. Both the photometry circuit 51 and the colorimetry circuit 52 are controlled by a CPU 39.

The surface Y1 includes a continuous shooting mode switch 13 and a release button 10. The continuous shooting mode switch 13 sets a continuous shooting mode during photography. The continuous shooting mode switch 13 indicates a type of photography action when a release button 10 is completely and continuously depressed. The release button 10 can detect a half depressed state and a completely depressed state. The half depressed state is when the release button is depressed approximately half a full stroke and the completely depressed state is when the release button is depressed a full stroke.

In embodiments, one frame is photographed when the release button 10 is completely depressed and the shooting mode switch 13 points to a position "S" (i.e., single shooting mode). A single frame is shot even when release button 10 is continuously pressed. Eight frames are photographed per second when the release button 10 is continuously and completely depressed and the continuous shooting mode switch 13 points to a position "L" (i.e., low speed continuous shooting mode). Thirty frames are photographed per second when the release button 10 is continuously and completely depressed and the continuous shooting mode switch 13 points to a position "H" (i.e., high speed continuous shooting mode).

Figure 2:
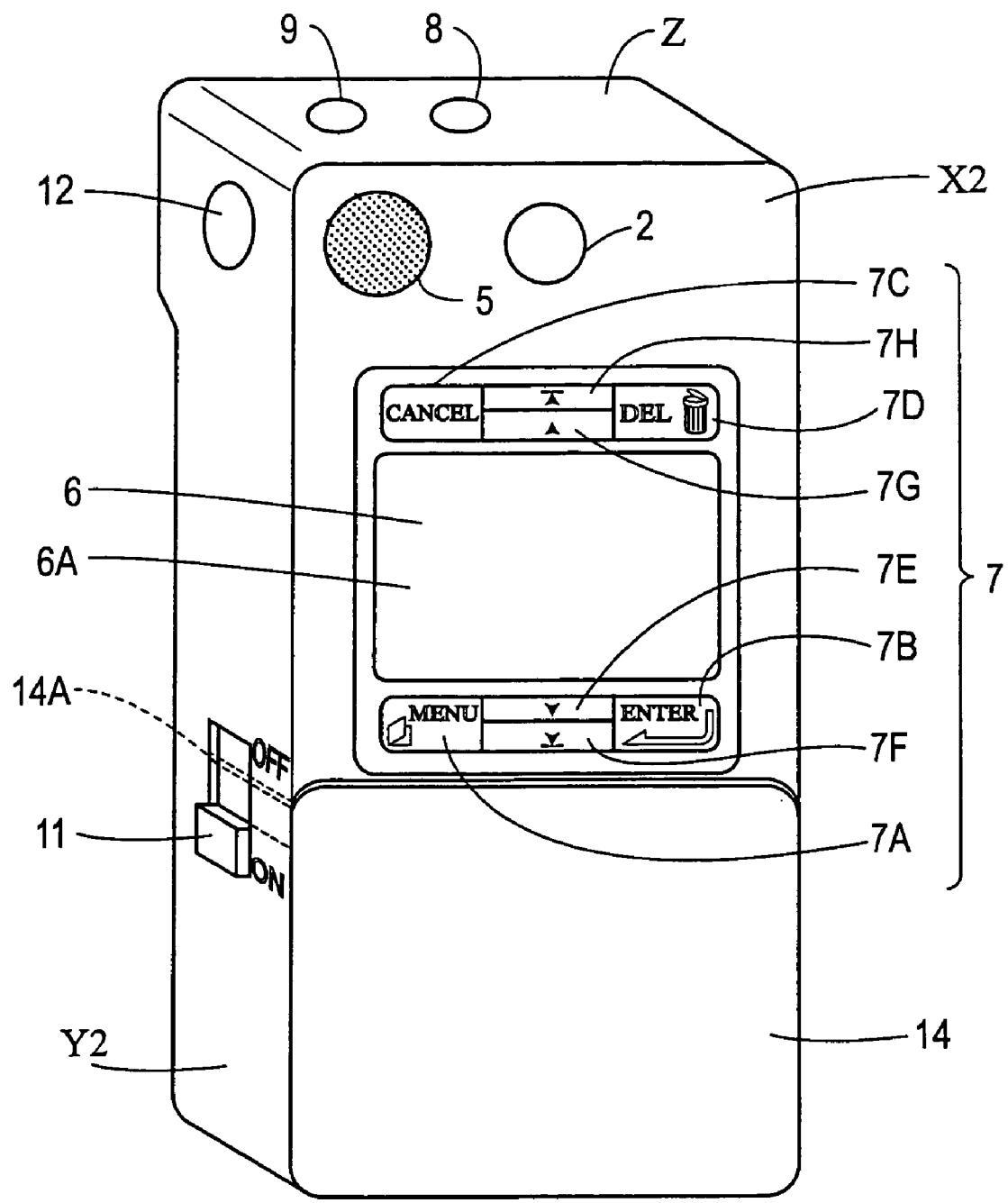
FIG. 2 is a rear perspective view of the FIG. 1 electronic camera with an LCD cover open.

FIG. 2 shows a rear surface X2 of the electronic camera. The viewfinder 2 and a speaker 5 are provided on the rear surface X2. The speaker 5 outputs sound which has been recorded in the electronic camera 1. A liquid crystal display (LCD) 6 and operation keys 7 are also provided on the rear surface X2. A touch tablet 6A is provided on the LCD 6 and outputs position information corresponding to a position designated through contact with the touch tablet 6A using, for example, a pen type instruction mechanism 41. The touch tablet 6A is preferably made from transparent materials such as resin, glass or the like. In preferred embodiments, the user observes the images displayed on the LCD 6 through the touch tablet 6A.

The operation keys 7 are actuable via the touch tablet 6A, and include (i) a menu key 7A, (ii) an enter key 7B, (iii) a clear key 7C, (iv) a cancel key 7D and (v) a scroll key 7E. Other operation keys also can be used with the invention.

In embodiments, the operation keys 7 detect user contact with the touch tablet 6A when data is displayed on the underlying LCD 6. The operation keys 7 are used in displaying (or otherwise outputting) previously recorded information and in performing photography. When actuated, the operation keys 7 output a signal to the CPU 39 corresponding to the operation that is being performed.

Referring particularly to the operation keys 7, when the menu key 7A is depressed, a menu screen for selecting various actions is displayed on the LCD 6. For example, a display listing the information that is recorded or items used in selecting actions for accomplishing various settings may be displayed. The enter key 7B reproduces the recorded information (e.g., image data and audio data) which is selected by the user. The enter key 7 may also be used for performing a photography action. The clear key 7C erases the selected recorded information from a list of recorded information. The cancel key 7D cancels the recording of the recorded information and the scroll key 7E scrolls up or down the display contents of the LCD 6.

As shown in FIG. 2, an LCD cover 14 covers the LCD 6 and the touch tablet 6A. When the LCD cover 14 is moved downward (e.g., an open position), the LCD 6 and the touch tablet 6A are visible. Also, when the LCD cover 14 is in the open position, a power source switch 11 located on side surface Y2 is turned ON by an arm member 14A of the LCD cover 14.

A microphone 8 for collecting audio data and an earphone jack 9 for connecting to an earphone are also provided on upper surface Z.

Figure 3:
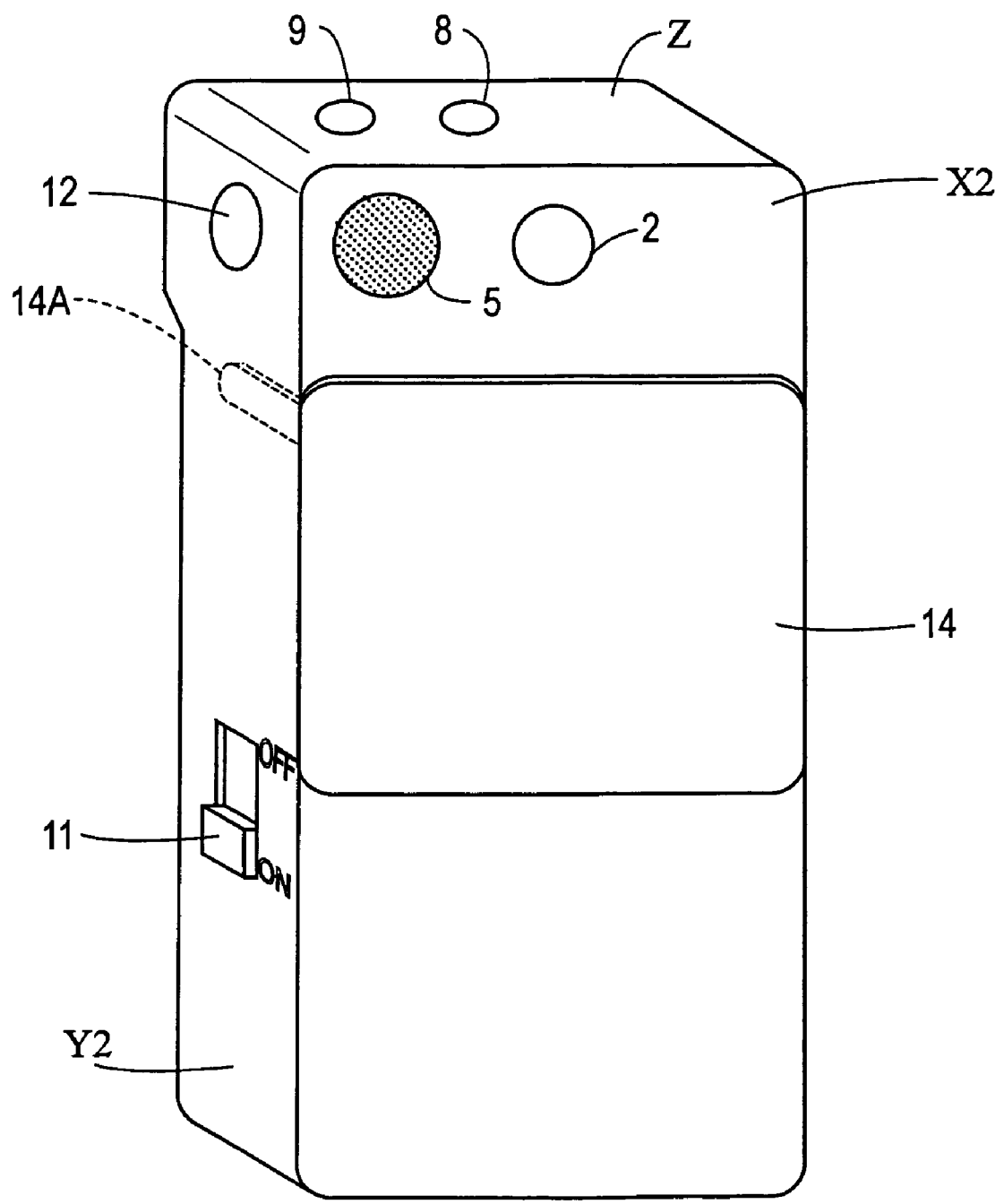
FIG. 3 is similar to FIG. 2, but with the LCD cover closed.
Figure 4:
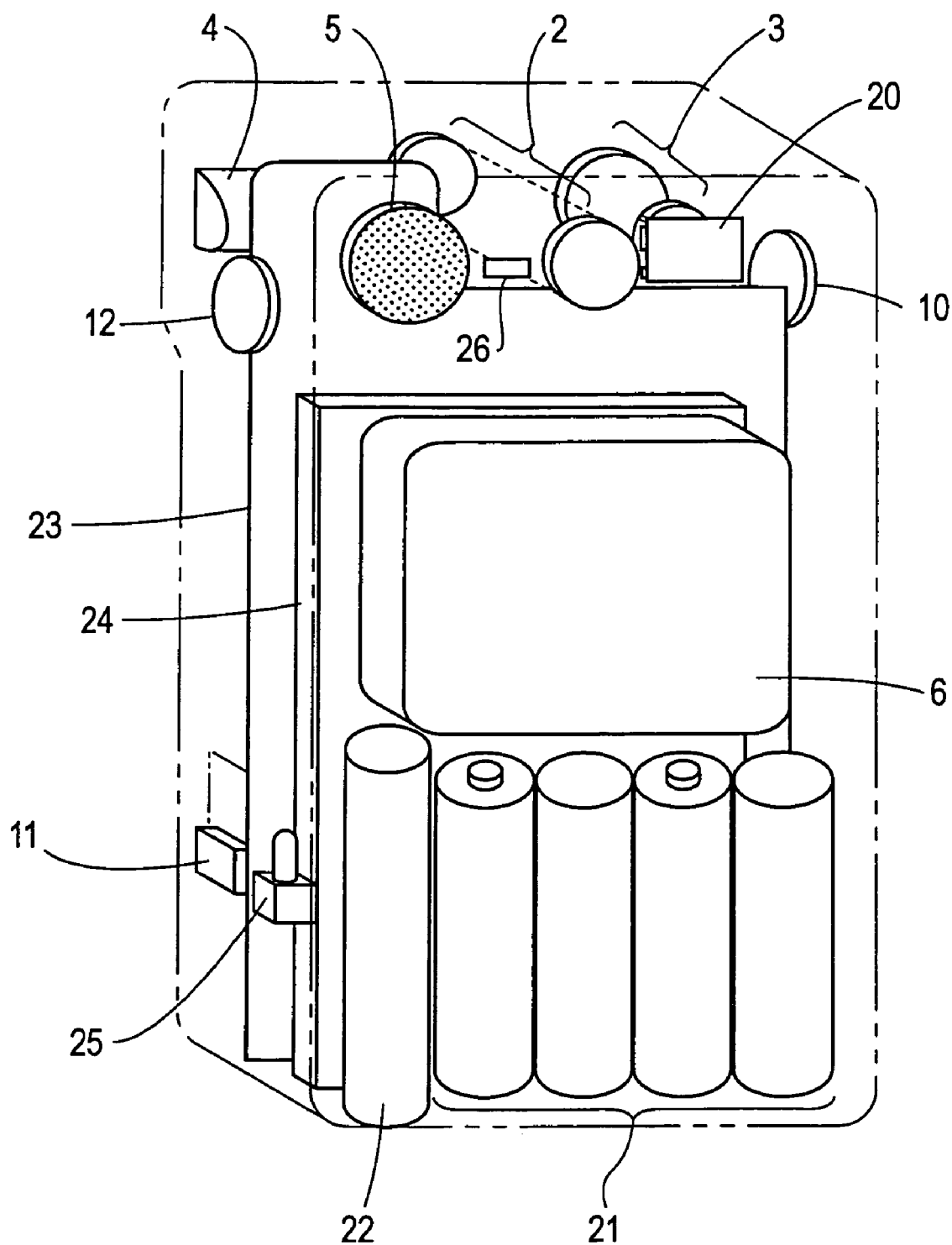
FIG. 4 shows an internal portion of the electronic camera of FIG. 1.

FIG. 3 shows the electronic camera 1 when the LCD cover 14 is positioned in the closed position over the LCD 6. FIG. 4 shows the interior components of the electronic camera 1.

Referring to FIG. 4, an audio recording button 12 for recording audio data is provided. The audio recording button 12 may be positioned at approximately the same height as the release button 10. However, the audio recording button 12 and the release button 10 may be located at different positions so that when either the release button 10 or the audio recording button 12 is depressed, the other button is not erroneously depressed. The power source switch 11 turns ON and OFF the electronic camera 1. A CCD 20, provided at the rear of the shooting lens 3, photoelectrically converts a photographed image into electrical (image) signals. An in-viewfinder display device 26 is positioned within the field of the viewfinder 2. The in-viewfinder display device 26 displays the setting states of various functions of the electronic camera 1.

In order to power the electronic camera 1, four cylindrical batteries 21, for example, are provided below the LCD 6. The electric power stored in the batteries 21 is supplied to the various camera components when the power is ON. A condenser 22 is provided below the LCD 6 and accumulates the electric charge used when the light emitting unit 4 emits light.

A circuit board 23 is provided proximate to the LCD 6, and preferably underneath the LCD 6. A plurality of circuits such as a CPU 39 and a DSP 33 (digital signal processor) are provided on the circuit board 23. A removable memory card 24 is provided between the circuit board 23, the LCD 6 and the batteries 21. The memory card 24 stores various information that is input into the electronic camera 1.

An LCD switch 25 is located proximate to the power switch 11 and is ON only when the LCD switch 25 is depressed. When the LCD switch 25 is ON, an image of the object received by the CCD 20 is displayed on the LCD 6 in real time. Accordingly, the LCD 6 may be used as an electronic viewfinder.

Figure 5:
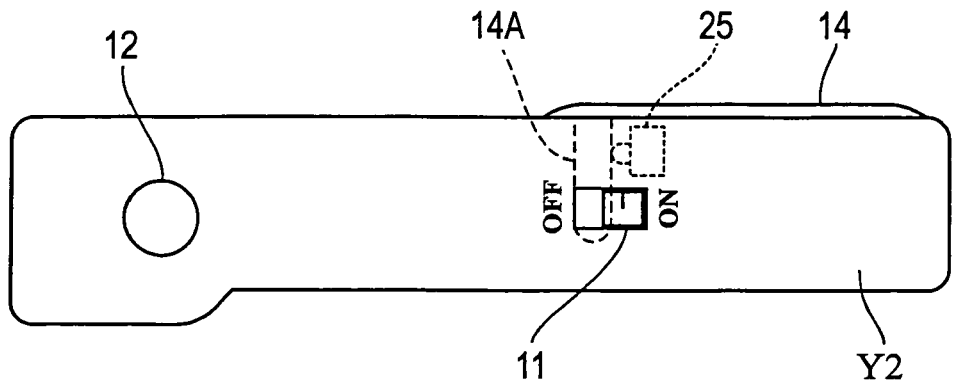
FIGS. 5(A)-5(C) are side views of the electronic camera showing different positions of an LCD switch and a power source switch.
Figure 5:
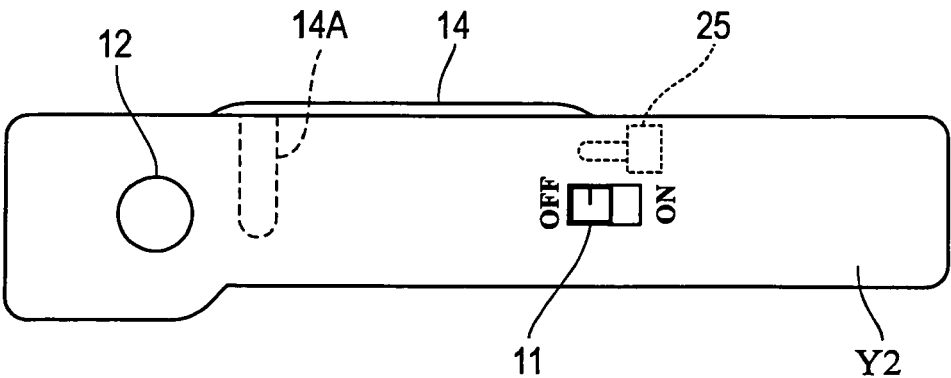
Figure 5:
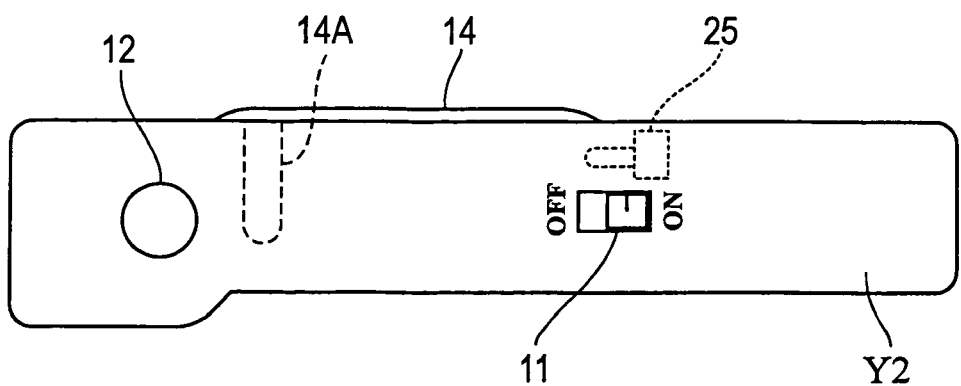

FIGS. 5(A)-5(C) show side views of the electronic camera 1 with the LCD cover 14 in various positions. FIG. 5A shows the LCD cover 14 in the open position and the LCD switch 25 and power switch 11 in an ON state. The LCD switch 25 and the power switch 11 are in the ON state due to the arm member 14A moving the switches in a downward position.

When the LCD cover 14 is positioned in the closed position over the LCD display 6, the power source switch 11 and the LCD switch 25 are in the OFF state. However, when the LCD cover 14 is in this position, the power source switch 11 may be switched to the ON state independent of the LCD switch 25. For example, as seen in FIG. 5(C), the power source switch 11 is ON and the LCD switch 25 remains OFF when the LCD cover 14 is positioned over the LCD 6. Because the power source switch 11 is ON, the electronic circuits are ON and photography actions such as photographing an object may be possible, even though the LCD 6 is not displaying information.

Figure 6:
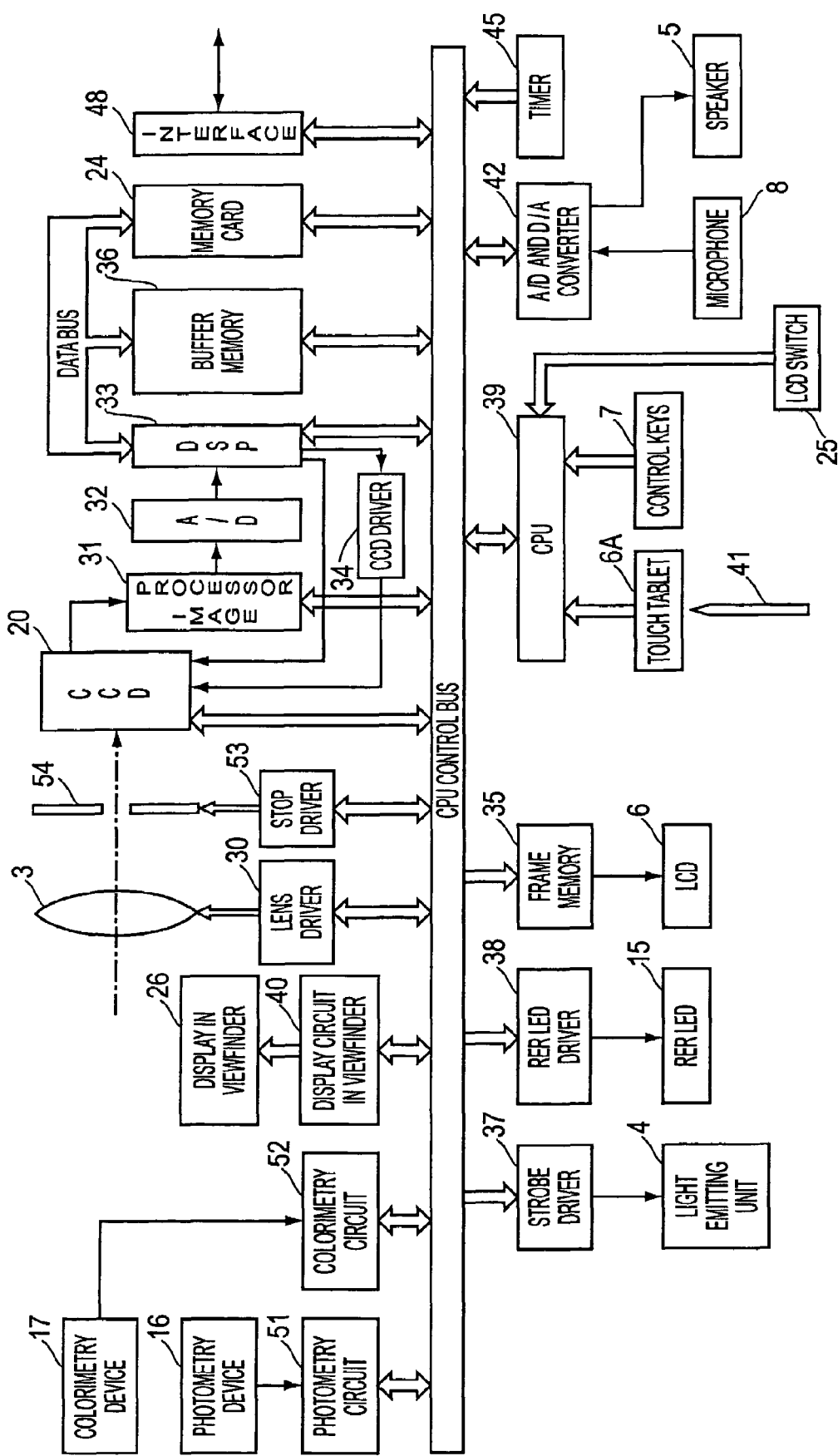
FIG. 6 is a block diagram of the internal electrical components of the electronic camera of FIG. 1.

FIG. 6 shows a block diagram of an embodiment of the internal structure of the electronic camera 1. The CCD 20 includes plural light receiving units corresponding to a predetermined number of pixels. The CCD 20 photoelectrically converts the light incident on the various light receiving units and produces image signals (e.g., electric signals) corresponding to the predetermined number of pixels. An image processing unit (image processor) 31 is controlled by the CPU 39 and amplifies sampled signals received from the CCD 20 to a preset level. The sampled signals preferably include timing samples of the image signals photoelectrically converted by the CCD 20. The CPU 39 also compresses digitized audio information and temporarily stores the digitized information including the compressed audio data in the buffer memory 36 before storing the data on the memory card 24.

An analog/digital conversion circuit (A/D converter) 32 digitizes the image signals sampled by the image processing unit 31 and supplies the digitized image signals to the DSP (Digital Signal Processor) 33. The DSP 33 controls a data bus connected to the buffer memory 36 and the memory card 24. After temporarily storing the image data supplied from the A/D conversion circuit 32 in the memory buffer 36, the DSP 33 compresses the image data and stores the compressed image data on the memory card 24. Accordingly, the buffer memory 36 is used as an input/output buffer for the data on the memory card 24. The DSP 33 also stores the image data supplied from the A/D conversion circuit 32 in a frame memory 35 and then displays this data on the LCD 6. Similarly, after reading the compressed image data from the memory card 24, DSP 33 decompresses the image data, stores the decompressed data in the frame memory 35 and displays this data on LCD 6.

The DSP 33 also supplies a CCD horizontal drive pulse to the CCD 20 and controls a CCD drive circuit (driver) 34 which supplies a CCD vertical drive pulse to the CCD 20. During startup of the electronic camera 1, the DSP 33 also causes the CCD 20 to adjust an electronic shutter time until an exposure level of the CCD 20 reaches a proper value.

An A/D-D/A conversion circuit (converter) 42 converts the analog signal corresponding to the audio detected by the microphone 8 into a digital signal. The A/D-D/A conversion circuit 42 then outputs the digital signal to the CPU 39. The A/D-D/A conversion circuit 42 also converts the digital audio data supplied from the CPU 39 into an analog audio signal and outputs the analog audio signal to the speaker 5.

The photometry circuit 51 performs a predetermined process on the analog signal that is provided from the photometry device 16. In embodiments, the photometry circuit 51 converts the analog signal into a digital signal and outputs the digital signal to the CPU 39. The CPU 39 then controls a stop driving circuit (driver) 53 to change the aperture diameter of the stop 54 in accordance with the photometry results received from the photometry device 16.

The colorimetry circuit 52 performs a predetermined process on the analog signal that is received from the colorimetry device 17. In embodiments, the colorimetry circuit 52 converts the analog signal into a digital signal and outputs the digital signal to the CPU 39. The CPU 39 receives the colorimetry results from the colorimetry device 17 and adjusts the white balance in accordance with these results.

A distance measuring circuit (not shown) converts a distance measurement value between the object being photographed and the electronic camera, as measured by the distance measurement device (also not shown), into a digital signal. The distance measurement circuit supplies the digital signal to the CPU 39 and the CPU 39 then controls a lens driving circuit (driver) 30 in accordance with the signal supplied from the distance measurement circuit. This process results in an auto focus action, thus causing the shooting lens 3 to move into focus.

A timer 45 having a built-in timer circuit outputs data corresponding to the present time (date and time) to the CPU 39. The CPU 39 uses the date and time data supplied from the timer 45 and records the information on the memory card 24 as image data and audio data management information.

The stop driving circuit 53 sets the aperture diameter of the stop 54 to a predetermined value. The stop 54 is preferably positioned between the shooting lens 3 and the CCD 20 and changes the aperture of light incident on the CCD 20 from the shooting lens 3.

An interface (I/F) 48 is provided so that data can be transmitted between the electronic camera and other apparatus such as, for example, a personal computer.

A strobe driving circuit (driver) 37 and a red-eye reduction (RER) lamp driving circuit (driver) 38 are also provided. The CPU 39 controls the red-eye reduction lamp 15 and light emitting unit 4 to emit a suitable amount of light. However, in preferred embodiments, the light emitting unit 4 does not emit light when the LCD cover 14 is in the open position so that the photography action may be performed as displayed in the electronic viewfinder.

CPU 39 also controls an in-viewfinder display circuit (driver) 40 to display various information on the in-viewfinder display device 26.

The CPU 39 receives position information from the touch tablet 6A and then processes the information. Specifically, when an area of the touch tablet 6A overlapping the LCD 6 is selected, the CPU 39 successively references the information of various data stored on the memory card 24 by reading the X-Y coordinates of the position pressed on the touch tablet 6A. By way of example, when the enter key 7B is pressed, the CPU 39 compresses the line drawing data in the buffer memory 36 prior to recording the data on the line drawing data recording area of the memory card 24. The line drawing data is also recorded along with the input date and time as header information to the line drawing data. In embodiments, the line drawing does not have to be compressed when the amount of line drawing information is small.

The user also can input line drawing data (memo data) by contacting the touch tablet 6A with pen 41. The X-Y coordinate(s) where the touch tablet 6A is touched is used by the CPU 39 to display a corresponding point (or points—such as a solid or broken line) on the LCD 6. Since the touch tablet 6A is transparent and overlies the LCD 6, it appears as if the user is writing on the LCD 6.

The line drawing data input into the touch tablet 6A contains a large amount of components with a high spatial frequency. Because of the large amount of components with a high spatial frequency, it is preferable to use a run length method to compress the data. The run length method compresses the line drawing and reduces information loss when decompressing the compressed line drawing data. This is accomplished by scanning the line drawing screen in a horizontal direction and encoding each continuous string of data (i.e., points) for each color (such as black, white, red, blue and the like) and each continuous string of no data (portions with no pen input). The run length method is a known method used in facsimile machines.

The JPEG (Joint Photographic Experts Group) method can be used to compress the shooting image data. Alternatively, other forms of compression (or no compression) can be used.

As will become clearer from the following description, various types of data can be input and stored by the electronic camera. For example, shooting image data, line drawing (memo) data and sound data can be input and stored. Each piece of data is stored with header information. Different pieces of data can be associated (correlated) with each other by correlating the header information of each piece of data. Correlation can be achieved, for example, by saving the same time (date and time) data as the header information (this is possible even-if the various pieces of data are not actually input at the same time). Pieces of data that are correlated to each other are considered to be members of the same data set. For example, a photographic image, a line drawing and a first audio data having correlated (e.g., the same) header information are part of a data set. When that data set is reproduced, it is possible to display the photographic image and the line drawing simultaneously (superposed) on LCD 6 while the sound corresponding to the audio data is output by the speaker 5.

According to the invention, any data set may be selected from among plural data sets composed of a plurality of types of correlated data. Assume that the selected data set includes first audio data. A second audio data corresponding to collected audio data may be stored in addition to the first audio data of the selected data set so that the sound corresponding to the first and second audio data may be continuously reproduced. Accordingly, it is possible to continuously reproduce the sound corresponding to the audio data belonging to that data set by designating the data set.

Figure 7:
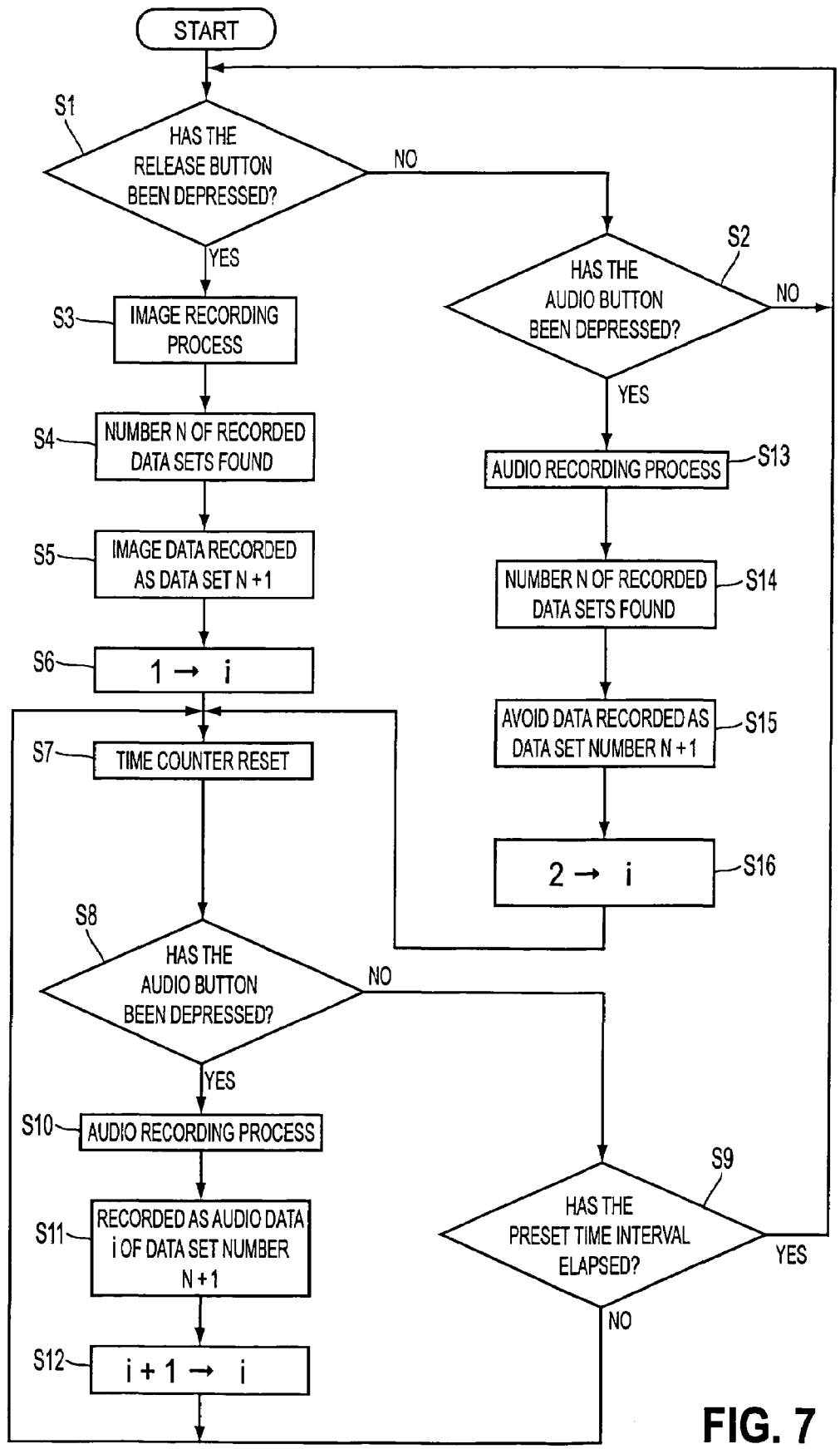
FIG. 7 is a flow chart showing a method of image recording and audio recording.

FIG. 7 is a flow chart showing a method of image recording and sound recording. In step S1 the CPU 39 makes a determination as to whether the release button 10 has been completely depressed. If the release button 10 is not completely depressed, a determination is made in step S2 as to whether the audio recording button 12 is depressed. If step S2 is negative, the process returns to step S1. Thus, the CPU 39 waits until either the release button 10 or the audio recording button 12 is depressed.

When the release button 10 is completely depressed, the CPU 39 controls the recording of the image in step S3. Specifically, the image processing circuit 31 samples signals corresponding to the image of the object. The sampled signals are converted into digital image data by the A/D conversion circuit 32 and output to the DSP 33. The DSP 33 temporarily stores the image data in the buffer memory 36, and compresses the data, for example, in accordance with the JPEG format.

In step S4 the CPU 39 determines the number N of data sets recorded on the memory card 24. In step S5 the CPU 39 records the image data compressed by the DSP 33 on the memory card 24 as the image data of data set N+1. The image data and management information such as the number of the data set and the photography date and the photography time are recorded on the memory card 24 as header information.

In step S6 the CPU 39 sets to 1 the value of the counter i used to count the audio data corresponding to the predetermined data set. In step S7 the CPU resets a time counter. After the image data is recorded, a determination is made in step S8 as to whether the audio recording button 12 is depressed.

If the audio recording button 12 is not depressed, the value of the time counter is referenced in step S9 and a determination is made as to whether a preset time interval has elapsed from when the image data was recorded. If the preset time interval has elapsed from when the image data was recorded, the process returns to step S1 and the CPU 39 waits until either the release button 10 or the audio recording button 12 is depressed. If the preset time interval has not elapsed from when the image data was recorded, the process returns to step S7.

If the audio recording button 12 is depressed at step S8, the process moves to step S10 where an audio recording process is performed. In the audio recording process, the audio signal collected by the microphone 8 while the audio recording button 12 is depressed is converted into digital audio data by the A/D-D/A conversion circuit 42. The digital audio data is then output to the CPU 39.

In step S11 the CPU 39 compresses the audio data before recording the data on the memory card 24 as audio data i of the data set having the same number (N+1) as the image data recorded in step S5. The audio data and management information including the number of the data set and the number of the audio data is recorded as header information.

After audio data number i has been recorded on the memory card 24, the CPU 39 increments the value of the counter i by 1 in step S12. The process returns to step S7 and the CPU 39 waits for either the preset time interval to elapse or the audio recording button 12 to be depressed.

Revisiting step S2, when it is determined in step S2 that the audio recording button is depressed, the process moves to step S13 and the audio recording process is performed. This is the same process as described in step S10.

In step S14 the CPU 39 finds the number of data sets recorded on the memory card 24. In step S15 the CPU records the audio data on the memory card 24 as the audio data of data set number (N+1). That is, a new data set is provided. It is to be noted that the audio data and management information including the number of the data set and the recording date and the recording time are recorded on the memory card 24 as header information. In step S116 the CPU 39 sets the value of the counter i used to count the audio data to 2 because audio data was recorded in step S15. The process then moves to step S7 and the same process from step S7 to step S12, as previously described, is performed.

By using the above process, audio data input before a preset time has elapsed from when (i) the image data was recorded, (ii) the audio data accompanying the image data was recorded, or (iii) independent audio data was recorded, is recorded on the memory card 24 as audio data of the data set to which the previous data belongs. That is, audio data input before a preset time has elapsed from when image data or audio data was input is stored as a continuous audio sequence.

Figure 8:
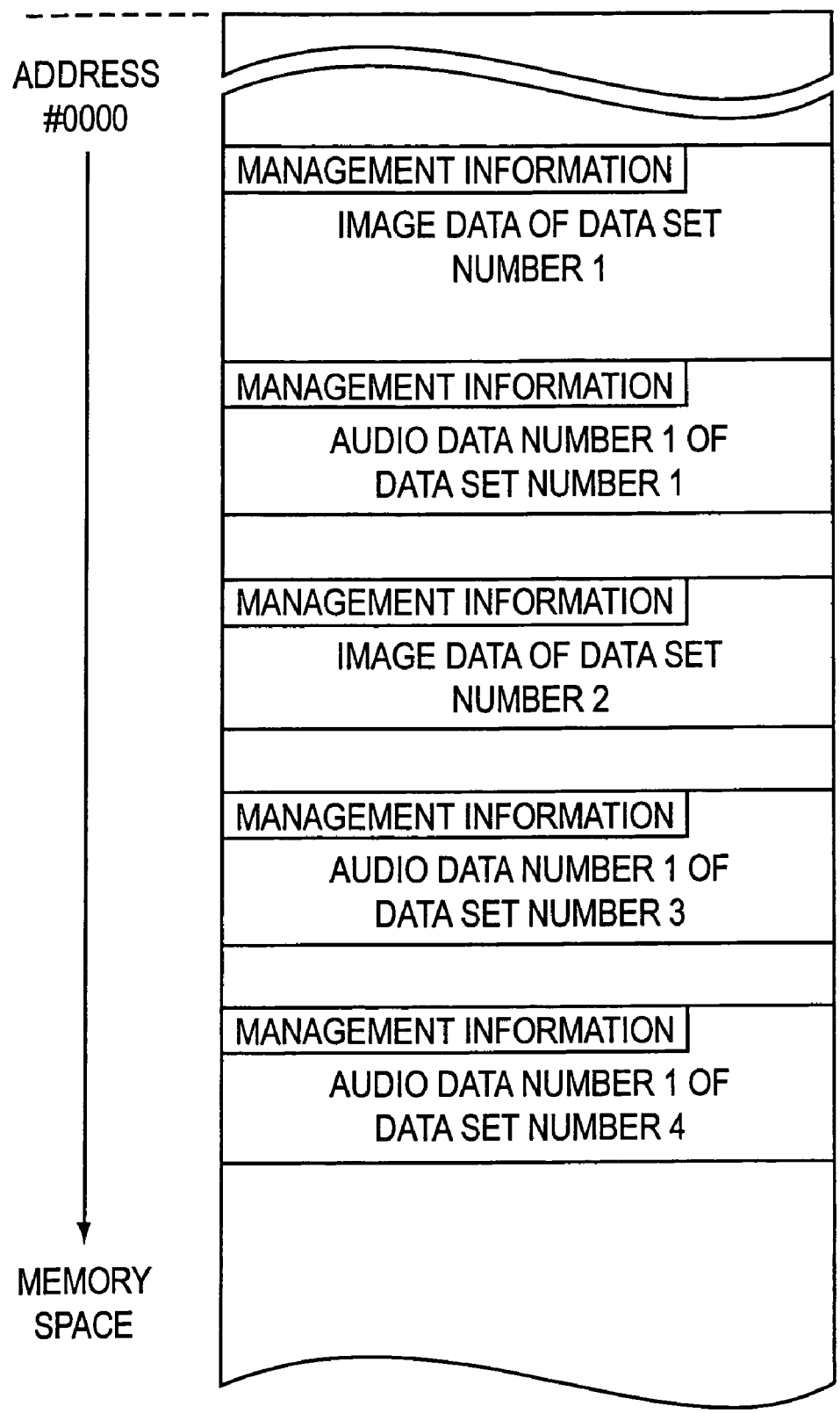
FIG. 8 shows one manner in which data is recorded on a memory card.

FIG. 8 shows an embodiment of various types of data being recorded on the memory card 24 assuming no data sets have been previously recorded (N=0). Image data is input by depressing the release button 10. Input of sound is followed by depressing the audio recording button 12 before a preset time interval (e.g., 3 seconds) has elapsed. The image data and the audio data corresponding to the input image and sound are recorded on the memory card 24 as the image data and audio data of data set 1. The management information of the image data and the audio data are also recorded in data set number 1.

After a preset time interval has elapsed from when the audio data is recorded, image data is again input by depressing the release button 10. The image data is recorded as the image data of data set 2. After a preset period of time has elapsed from when the image data of data set number 2 is recorded, audio data is input by depressing the audio recording button 12. The input audio data is recorded as the audio data of data set 3. After a preset time interval has elapsed from when the audio data of data set 3 is recorded, sound is again input by depressing the audio recording button 12 and is recorded as the audio data of data set number 4.

Figure 9:
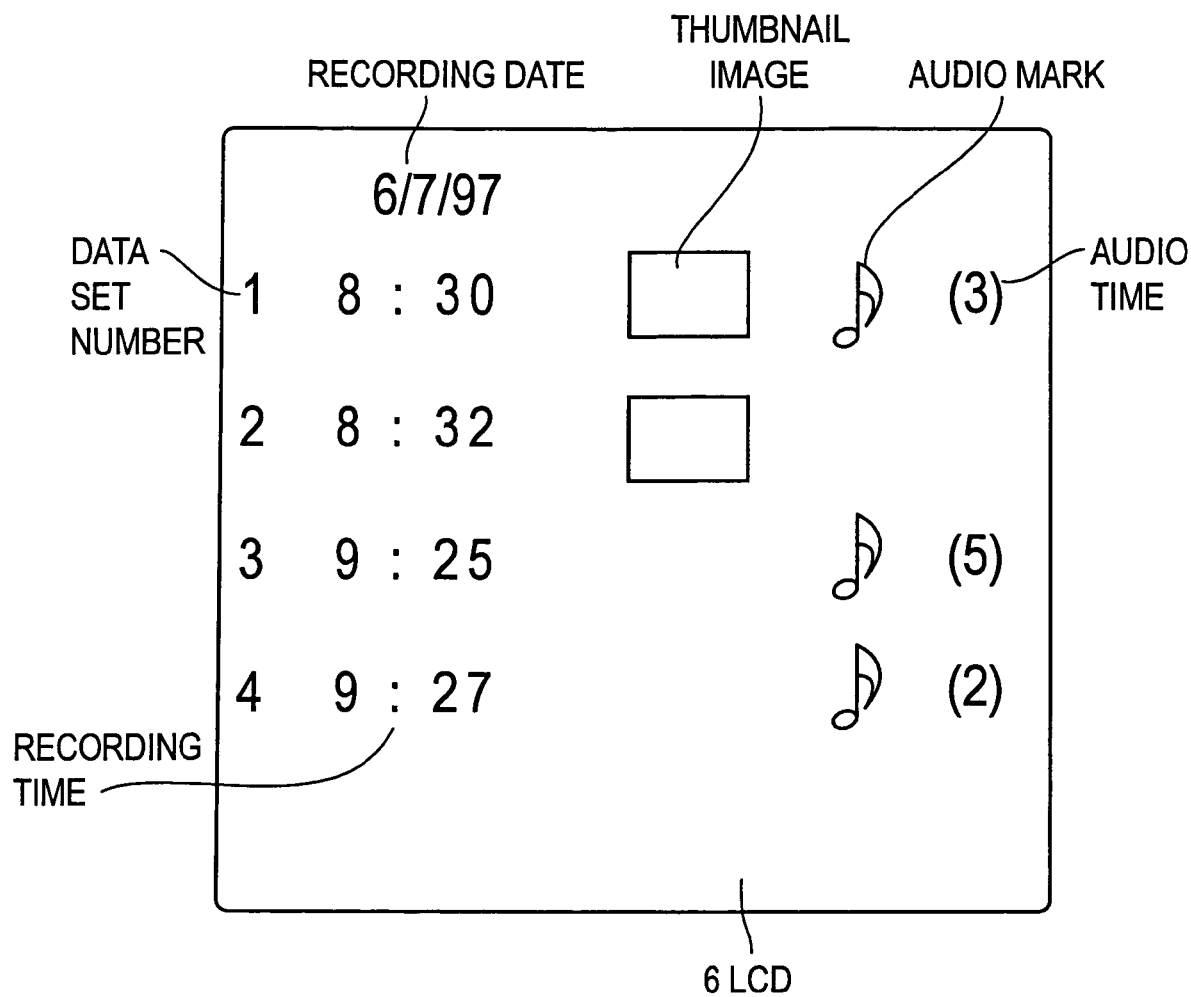
FIG. 9 shows an embodiment of a display of a table of data sets.

FIG. 9 shows the LCD 6 having a data set number, recording date and time, thumbnail image, audio mark and audio time for each collected data set. In this example, data set number 1 includes image data corresponding to an image recorded at 8:30 and audio data corresponding to audio that is three seconds long. Data set number 2 includes image data corresponding to an image recorded at 8:32. Data set number 3 includes audio data corresponding to sound that is five seconds long and recorded at 9:25. Data set number 4 includes audio data corresponding to sound that is two seconds long and recorded at 9:27. When line drawing data is included in a data set, a mark unrepresented in FIG. 9, is displayed as one part of the data for that data set.

Figure 10:
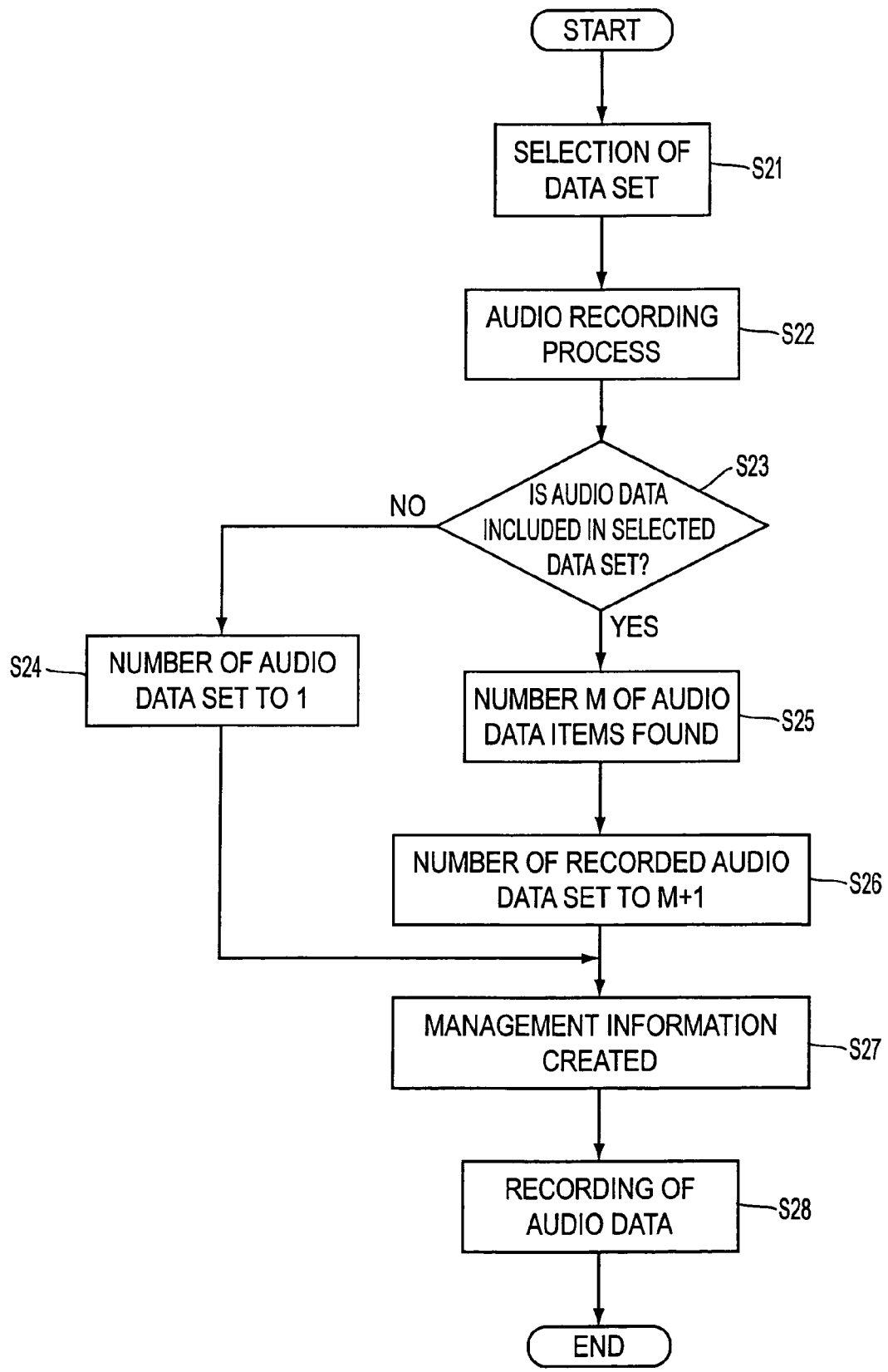
FIG. 10 is a flow chart showing a method of adding audio data to a recorded data set.

FIG. 10 is a flow chart of a process when audio data is added to a recorded data set. In step S21 a user selects a data set (e.g., by touching the data set number with pen 41) and the CPU 39 receives the signal corresponding to the pressed operation and reverses the display colors of the display of that data set. In step S22 when the audio recording button is pressed by the user, the A/D-D/A conversion circuit 42 receives the audio data corresponding to the sound collected by the microphone 8. In step S23 the CPU 39 makes a determination as to whether audio data is included in the data set selected by the user. When the determination is that audio data is not included in that data set, the number of the audio data is set to 1 in step S24.

When it is determined that the audio data is included in the data set, the process moves to step S25 and the CPU 39 references the management information of each audio data item on the memory card 24 to find the number M of audio data items included in that data set. In step S26 the process sets the number (M+1). In step S27 the process creates management information such as (i) the number of the audio data, (ii) the number of the selected data and (iii) the date and the time data supplied from the timer 45. This is performed after the number of the audio data corresponding to the recorded sound is set. In step S28 the process records the audio data on the memory card 24 along with the management information.

By utilizing the above process, audio data may be added to the selected data set. That is, audio data having as one part of the management information the number of the selected data set and the number of the audio data that is one number larger than the number of audio data items previously belonging to that data set may be recorded on the memory card 24.

Figure 11:
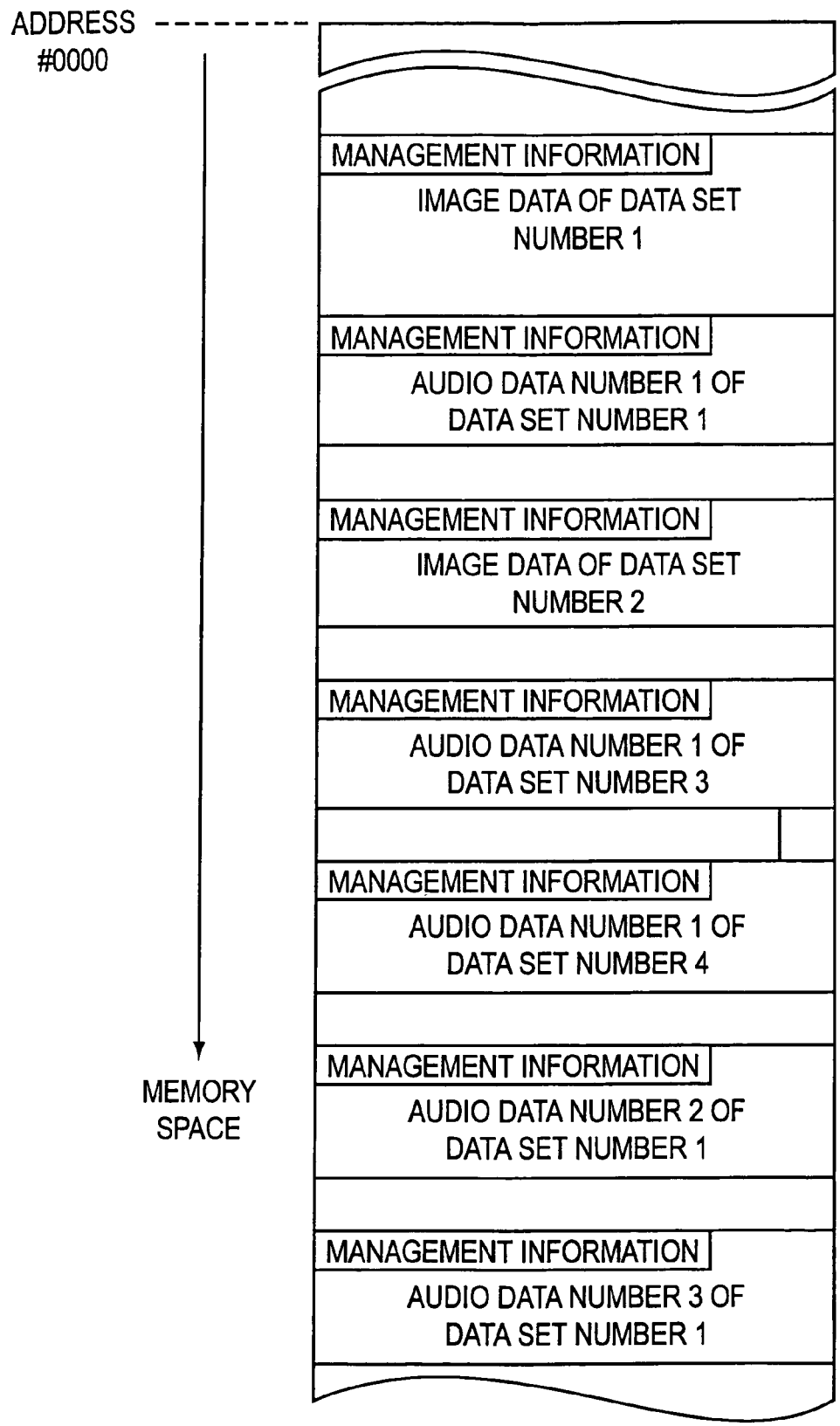
FIG. 11 shows another manner in which data is recorded on the memory card.
Figure 12A:
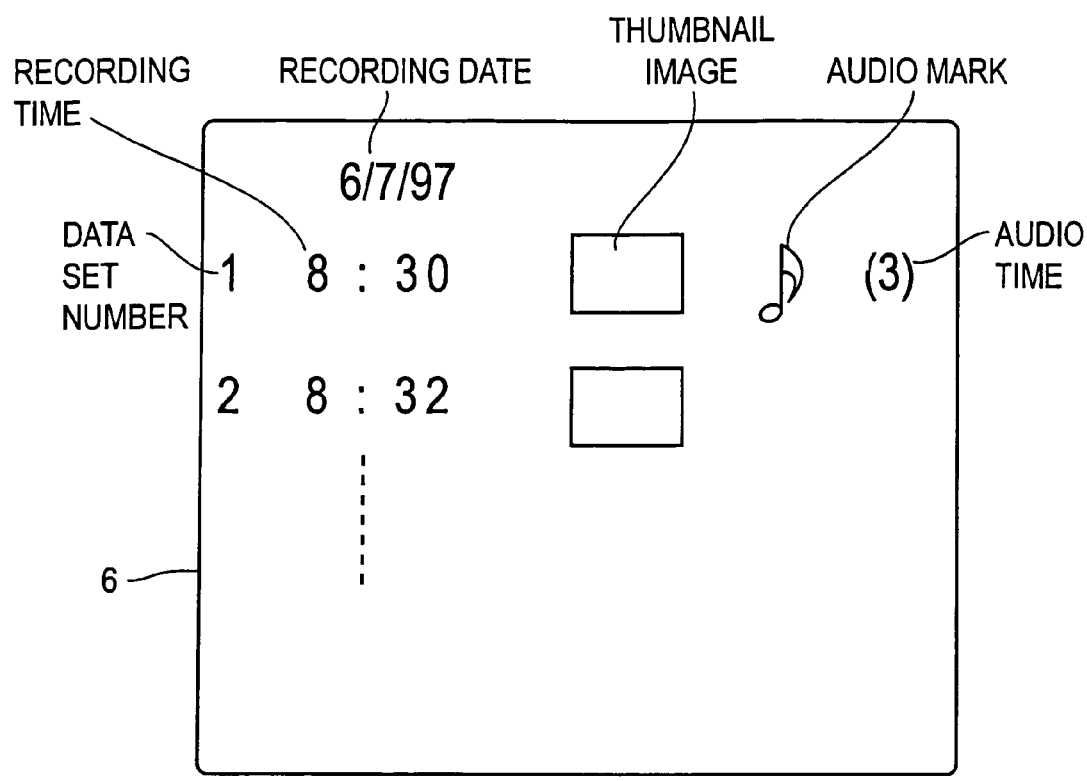
FIGS. 12(A)-12(C) show one example of the displays of a table of data sets when audio data has been added.
Figure 12B:
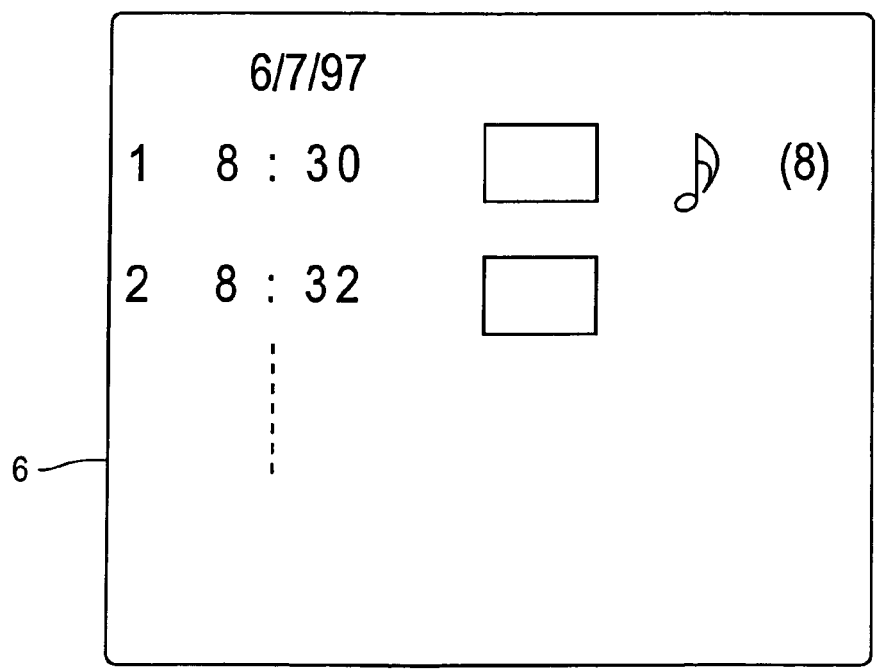

By way of example, when the audio recording button 12 is depressed, sound is collected by the microphone 8. The audio data corresponding to the collected sound is supplied to the CPU 39. The audio data is then compressed and recorded on the memory card 24 as audio data 2 of data set 1 (FIG. 11). When the recorded time is 5 seconds, the value of the audio time and the display of the data set display on the LCD 6 is changed from 3 to 8 (FIGS. 12(A) and 12(B)). That is, the sum of the length of the audio items corresponding to all of the audio data belonging to data set 1 is displayed as the value for that audio time.

Figure 12C:
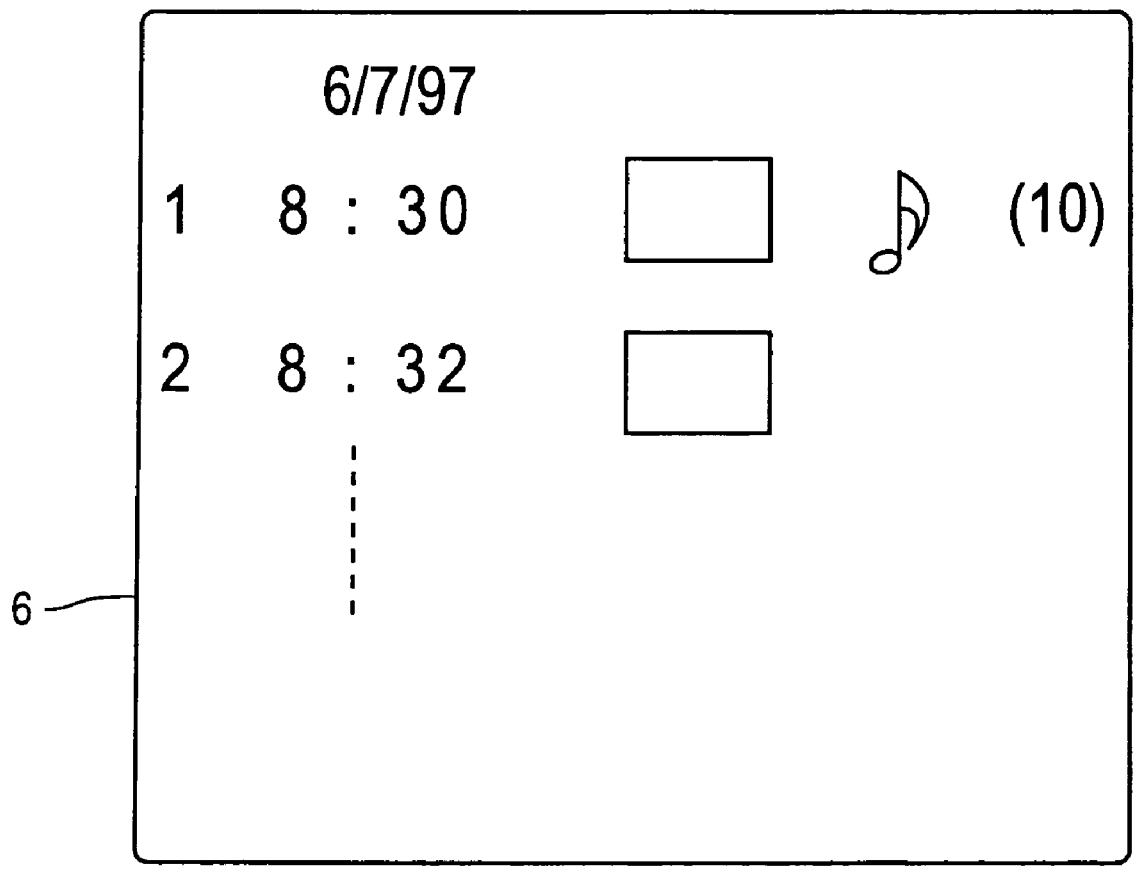

When the data set number 1 is again selected, and sound that is two seconds long is recorded, and the audio data corresponding to that sound is recorded on the memory card 24 as audio data 3 of data set 1 (FIG. 11). The value 10 is displayed as the audio time of data set 1 (FIG. 12(C)). Note that the display of the recording date and time remains at 8:30 even if audio data is added (FIG. 12(C)). However, it is also possible to update this time to the time when the new audio data is added.

Figure 13A:
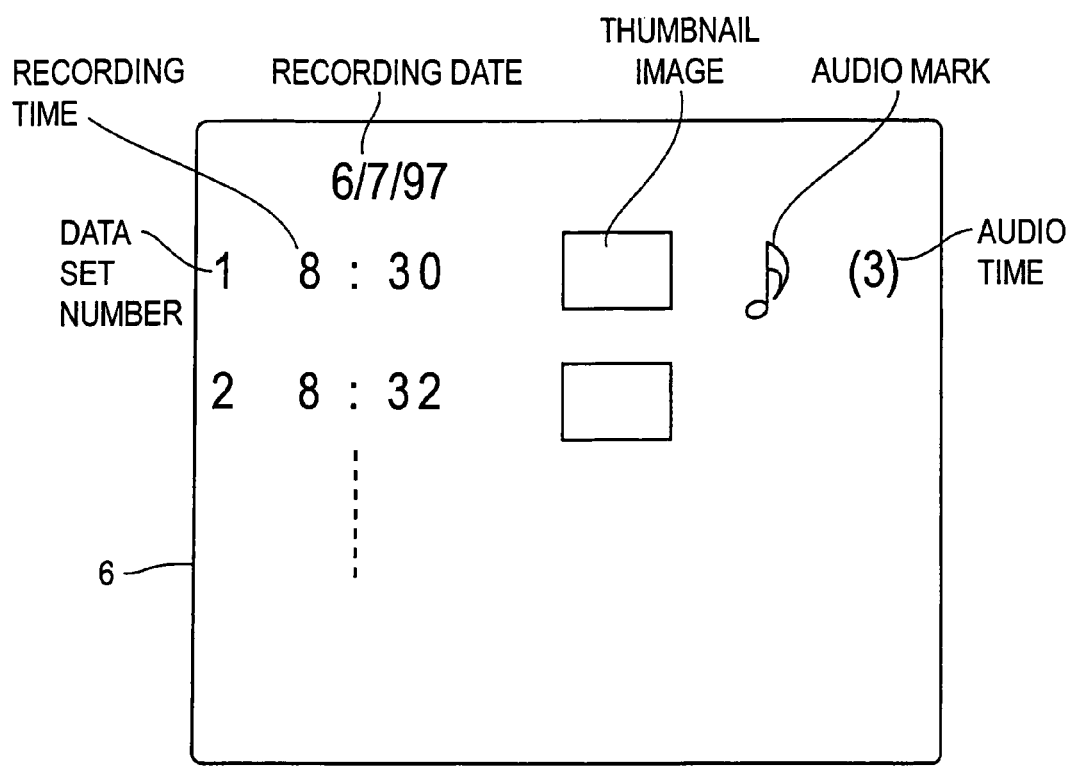
FIGS. 13(A)-13(C) show additional displays of a table of data sets when audio data has been added.
Figure 13B:
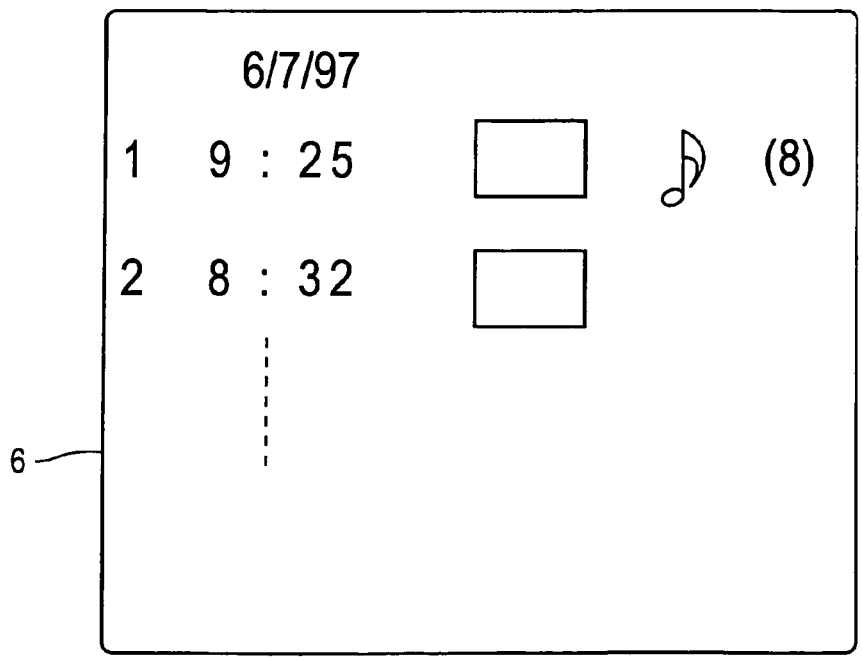
Figure 13C:
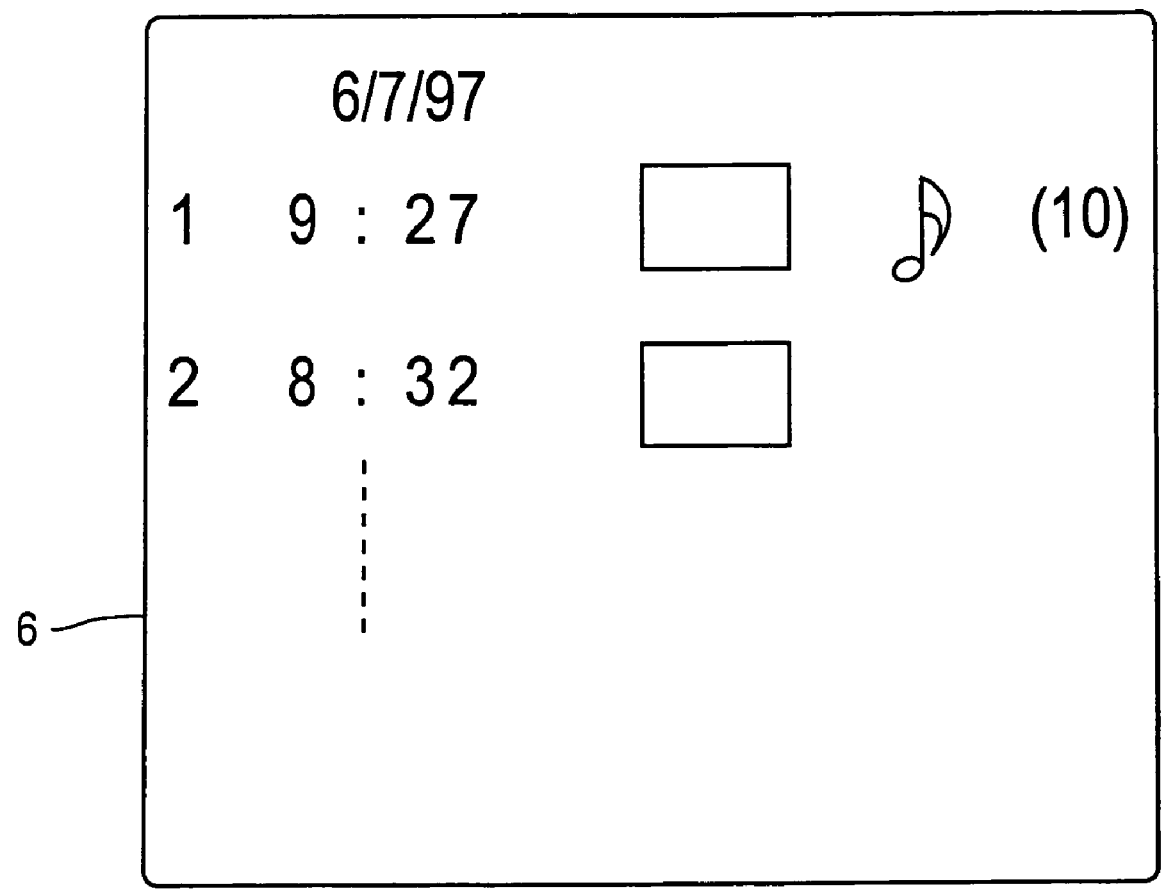

When the above described data number 2 is added to data set number 1 at 9:25, the display of the recording date and time for data set number 1 can change from that shown in FIG. 13(A) to 9:25 (FIG. 13(B)). When the audio data number 3 is added to data set number 1 at 9:27, the display of the recorded data and the time for data set 1 changes to 9:27 (FIG. 13C)). This provides continuous sound playback corresponding to an associated image, regardless of when the sound is recorded.

Although the JPEG and run length encoding compression techniques were described, other compression techniques (or no compression at all) can be used with the invention.

Although a touch tablet with input pen were described as structures through which selections and commands can be input, the invention is not limited to such structure. For example, the touch tablet can be actuable by the user's finger. Additionally, selections and commands can be input without using a touch tablet. For example, a cursor can be moved (e.g., via a mouse) and selections or commands can be made by clicking.

The invention is not limited to implementation by a programmed general purpose computer as shown in the preferred embodiment. For example, the invention can be implemented using one or more special purpose integrated circuit(s) (e.g., ASIC). It will be appreciated by those skilled in the art that the invention can also be implemented using one or more dedicated or programmable integrated or other electronic circuits or devices (e.g., hardwired electronic or logic circuits such as discrete element circuits, or programmable logic devices such as PLDs, PLAs, PALs or the like). In general, any device or assembly of devices on which a finite state machine capable of implementing the flow charts shown in FIGS. 7 and 10 can be used.

While this invention has been described in conjunction with specific embodiments thereof, it is evident that many alternatives, modifications and variations will be apparent to those skilled in the art. Accordingly, the preferred embodiments of the invention set forth herein are intended to be illustrative, not limiting. Various changes may be made without departing from the spirit and scope of the invention as defined in the following claims.

What is claimed is:

1. An information processing apparatus, comprising:
   storage means for storing data sets having plural types of correlated data therein;
   selection means for selecting a data set from the data sets stored in said storage means;
   audio collecting means for collecting sound and converting said sound into audio data; and
   control means for storing second audio data collected and converted by the audio collecting means in said storage means, said control means storing said second audio data correlated to first audio data of the data set selected by said selection means as a sequentially continuous audio sequence if the second audio data is inputted before a preset time has elapsed from when the first audio data was recorded.

2. The information processing apparatus of claim 1, wherein said data sets include at least one of an image data, an audio data and a line drawing data.

3. The information processing apparatus of claim 2, further comprising:
light collecting means for collecting light from an object being photographed;
photoelectric conversion means for converting the collected light into an electrical signal; and
conversion means for converting said electric signal into the image data, the image data being stored in said storage means.

4. The information processing apparatus of claim 2, further comprising:
outputting means for outputting a signal, said signal indicating a pressed position on a pressure detection unit of predetermined surface area; and
conversion means for converting the signal output by said outputting means into the line drawing data, the line drawing data being stored in said storage means.

5. The information processing apparatus of claim 1, further comprising:
display means for displaying a list of the data sets stored in said storage means; and
display control means for computing a total length of recording time of audio data belonging to said data sets stored in said storage means and for displaying the total on said display means.

6. The information processing apparatus of claim 1, wherein: said control means updates a time information of a data set when the stored second audio data is stored correlated to the data set.

7. The information processing apparatus of claim 1, wherein said audio data is digital data.

8. The information processing apparatus of claim 1, wherein when new image data is stored, said selection means selects a data set having the new image data for a preset time interval.

9. An information processing apparatus, comprising:
audio collecting means for collecting sound and converting the sound into audio data;
storage means for storing audio data;
selection means for selecting a data set stored in said storage means; and
control means for controlling said storage means so that second audio data collected and converted by said audio collecting means is stored correlated to first audio data of the data set selected by said selection means as a sequentially continuous audio sequence if the second audio data is inputted before a preset time has elapsed from when the first audio data was recorded.

10. The information processing apparatus of claim 9, wherein said control means updates a time information of said first audio data in accordance with the second audio data.

11. The information processing apparatus of claim 9, wherein: said control means causes the second audio data to be stored in said storage means without being correlated to said first audio data when said data set is not selected by said selection means.

12. The information processing apparatus of claim 11, wherein said control means updates a time information of said first audio data in accordance with the second audio data when said second audio data and said first audio data are stored in said storage means correlated to each other, and said control means stores time information of said second audio data when the second audio data is not correlated to the first audio data.

13. An information processing apparatus, comprising:
a memory that stores data sets having plural types of correlated data therein;
a selector that selects a data set from the data sets stored in said memory;
a microphone that collects sound and converts said sound into audio data; and
a controller coupled to the memory, the selector and the microphone, to store second audio data collected and converted by the microphone in said memory, said controller storing said second audio data correlated to first audio data of the data set selected by said selector as a sequentially continuous audio sequence if the second audio data is inputted before a preset time has elapsed from when the first audio data was recorded.

14. The information processing apparatus of claim 13, wherein said data sets include at least one of an image data, an audio data and a line drawing data.

15. The information processing apparatus of claim 14, further comprising:
a lens system that collects light from an object being photographed;
a photoelectric converter that receives the light collected by the lens system to convert the collected light into the image data, the image data being stored in said memory.

16. The information processing apparatus of claim 14, further comprising:
a touch tablet coupled to the controller to output a signal indicating a pressed position on a the touch tablet, the controller converting the signal output by said touch tablet into the line drawing data, the line drawing data being stored in said memory.

17. The information processing apparatus of claim 13, further comprising:
a display that displays a list of the data sets stored in said memory; and
a display controller that computes a total length of recording time of audio data belonging to said data sets stored in said memory and that displays the total on said display.

18. The information processing apparatus of claim 13, wherein:
said controller updates a time information of a data set when the stored second audio data is stored correlated to the data set.

19. The information processing apparatus of claim 13, wherein said audio data is digital data.

20. The information processing apparatus of claim 13, wherein when new image data is stored, said selector selects a data set having the new image data for a preset time interval.

21. An information processing apparatus, comprising:
a microphone that collects sound and converts the sound into audio data;
a memory that stores audio data;
a selector that selects a data set stored in said memory; and
a controller coupled to the microphone, the memory and the selector, to control said memory so that second audio data collected and converted by said microphone is stored correlated to first audio data of the data set selected by said selector as a sequentially continuous audio sequence if the second audio data is inputted before a preset time has elapsed from when the first audio data was recorded.

22. The information processing apparatus of claim 21, wherein said controller updates a time information of said first audio data in accordance with the second audio data.

23. The information processing apparatus of claim 21, wherein:

said controller causes the second audio data to be stored in said memory without being correlated to said first audio data when said data set is not selected by said selector.

24. The information processing apparatus of claim 23, wherein said controller updates a time information of said first audio data in accordance with the second audio data when said second audio data and said first audio data are stored in said memory correlated to each other, and said controller stores time information of said second audio data when the second audio data is not correlated to the first audio data.

25. A method of processing information, comprising the steps of:
storing data sets having plural types of correlated data therein in memory;
selecting a data set from the data sets stored in said memory;
collecting sound and converting said sound into audio data; and
storing collected and converted second audio data in said memory correlated to first audio data of the selected data set as a sequentially continuous audio sequence if the second audio data is inputted before a preset time has elapsed from when the first audio data was recorded.

26. The method of claim 25, wherein said data sets include at least one of an image data, an audio data and a line drawing data.

27. The method of claim 26, further comprising:
collecting light from an object being photographed; and
converting the collected light into the image data, the image data being stored in said memory.

28. The method of claim 26, further comprising:
outputting a signal indicating a pressed position on a pressure detection unit of predetermined surface area; and
converting the output signal into the line drawing data, the line drawing data being stored in said memory.

29. The method of claim 25, further comprising:
displaying a list of the data sets stored in said memory; and
computing and displaying a total length of recording time of audio data belonging to said data sets stored in said memory.

30. The method of claim 25, further comprising:
updating a time information of a data set when the stored second audio data is stored correlated to the data set.

31. The method of claim 25, wherein said audio data is digital data.

32. The method of claim 25, wherein when new image data is stored, said selected data set is, for a preset time interval, the data set having the new image data.

33. A method of processing information, comprising the steps of:
collecting sound and converting the sound into audio data;
storing audio data in memory;
selecting a data set stored in said memory; and
storing collected and converted second audio data correlated to first audio data of the selected data set as a sequentially continuous audio sequence if the second audio data is inputted before a preset time has elapsed from when the first audio data was recorded.

34. The method of claim 33, further comprising updating a time information of said first audio data in accordance with the second audio data.

35. The method of claim 33, wherein:
the second audio data is stored in said memory without being correlated to said first audio data when said data set is not selected.

36. The method of claim 35, further comprising updating a time information of said first audio data in accordance with the second audio data when said second audio data and said first audio data are stored in said memory correlated to each other, and storing time information of said second audio data when the second audio data is not correlated to the first audio data.

37. A computer-readable medium encoded with a computer program executable by an information processing apparatus to perform the steps of:
storing data sets comprising a plurality of types of correlated data in memory;
selecting a data set from the data sets stored in said storing step;
collecting sound and converting the sound to audio data; and
storing second audio data collected and converted in the collecting step in the memory correlated with first audio data of the data set selected in the selecting step as a sequentially continuous audio sequence if the second audio data is inputted before a preset time has elapsed from when the first audio data was recorded.

38. A computer-readable medium encoded with a computer program executable by an information processing apparatus to perform the steps of:
collecting sound and converting the sound into audio data;
storing audio data in memory;
selecting a data set stored in said memory; and
storing collected and converted second audio data correlated to first audio data of the selected data set as a sequentially continuous audio sequence if the second audio data is inputted before a preset time has elapsed from when the first audio data was recorded.

* * * * *